(12) United States Patent
Khonsari et al.

(10) Patent No.: US 11,887,356 B2
(45) Date of Patent: Jan. 30, 2024

(54) SYSTEM, METHOD AND APPARATUS FOR TRAINING A MACHINE LEARNING MODEL

(71) Applicant: HUAWEI TECHNOLOGIES CO., LTD., Guangdong (CN)

(72) Inventors: Forouqsadat Khonsari, Toronto (CA); Jaspreet Singh Sambee, Brampton (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 583 days.

(21) Appl. No.: 17/110,923

(22) Filed: Dec. 3, 2020

(65) Prior Publication Data
US 2022/0180123 A1    Jun. 9, 2022

(51) Int. Cl.
*G06V 10/774*    (2022.01)
*G06V 10/82*    (2022.01)

(52) U.S. Cl.
CPC ........ *G06V 10/7747* (2022.01); *G06V 10/774* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 11,205,099 B2 * | 12/2021 | Shlens | G06N 20/00 |
| 2012/0288186 A1 | 11/2012 | Kohli et al. | |
| 2018/0260735 A1 * | 9/2018 | Arad | G06N 20/00 |
| 2020/0110994 A1 * | 4/2020 | Goto | G06V 10/82 |

(Continued)

FOREIGN PATENT DOCUMENTS

| CN | 108171175 A | 6/2018 |
|---|---|---|
| CN | 110534195 A | 12/2019 |

OTHER PUBLICATIONS

International Search Report and Written Opinion issued in co-pending International application No. PCT/CN2021/134922 dated Feb. 25, 2022.

(Continued)

*Primary Examiner* — Vincent Rudolph
*Assistant Examiner* — Meredith I Taylor
(74) *Attorney, Agent, or Firm* — BCF LLP

(57) ABSTRACT

The disclosed systems, structures, and methods are directed to receiving a training data set comprising a plurality of original training samples, augmenting the original training samples by applying default transformations, training the machine learning model on at least a portion of the original training samples and at least a portion of the first set of augmented training samples, computing an unaugmented accuracy, augmenting the original training samples and the first set of augmented training samples by applying a candidate transformation, training the machine learning model on at least a portion of the original training samples, at least a portion of the first set of augmented training samples, and at least a portion of the second set of augmented training samples, computing an augmented accuracy, computing an affinity metric from the unaugmented accuracy and the augmented accuracy, and updating the candidate augmentation transformations list and the default augmentation transformations list.

20 Claims, 9 Drawing Sheets

(56) References Cited

U.S. PATENT DOCUMENTS

2020/0183035 A1    6/2020    Liu et al.

OTHER PUBLICATIONS

Cubuk et al., AutoAugment: Learning Augmentation Strategies from Data, 2019.
Lim et al., Fast AutoAugment, 2019.
Ho et al., Population based augmentation: efficient learning of augmentation policy schedules, 2019.
Cubuk et al., RandAugment: Practical automated data augmentation with a reduced search space, Nov. 2019.
Zhang et al., Adversarial autoaugment, Dec. 2019.
Chen et al., UniformAugment: A search-free probabilistic data augmentation approach, Mar. 2020.
Gontijo-Lopes et al., Affinity and Diversity: Quantifying Mechanisms of Data Augmentation, Jun. 2020.

* cited by examiner

| Transform | Normalized affinity |
|---|---|
| flipV | -0.2877 |
| flipH | -0.2917 |
| ShearX | -0.0030 |
| ShearY | -0.0131 |
| translateX | -0.1003 |
| translateY | -0.1195 |
| rotate | -0.0192 |
| autocontrast | 0 |
| Invert | -0.4305 |
| Equalize | -0.0030 |
| Solarize | -0.1560 |
| Posterize | 0 |
| Contrast | -0.0496 |
| Color | 0 |
| Brightness | -0.0709 |
| Sharpness | 0 |

FIG. 4A

| Augmentation | Test accuracy |
|---|---|
| None | 0.994 |
| UA set: All Augmentations | 0.986 |
| UA set: All Augmentations except Invert, FlipV and FlipH | 0.996 |

FIG. 4B

| Transform | Range | Normalized affinity |
|---|---|---|
| ShearX | (-0.3,0.3) | -0.4672 |
| ShearX | (-0.6,0.6) | -0.1180 |
| ShearY | (-0.3,0.3) | -0.0612 |
| ShearY | (-0.6,0.6) | -0.1690 |
| translateX | (-0.45,0.45) | -0.0718 |
| translateX | (-0.9,0.9) | -0.2267 |
| translateY | (-0.45,0.45) | -0.0962 |
| translateY | (-0.9,0.9) | -0.2324 |
| rotate | (-30,30) | -0.1693 |
| rotate | (-60,60) | -0.25 |
| autocontrast | | -0.0237 |
| Invert | | -0.2938 |
| Equalize | | -0.1482 |
| Solarize | | -0.1889 |
| Posterize | | -0.0929 |
| Contrast | | -0.1276 |
| Color | | -0.0340 |
| Brightness | | -0.1180 |
| Sharpness | | -0.0247 |
| cutout | (0,0.2) | -0.1166 |
| cutout | (0,0.4) | -0.0718 |

FIG. 4C

| Augmentation | Test accuracy |
|---|---|
| None | .968 |
| UA set: All transforms with wide ranges | 0.970 |
| UA set: Rotate, TranslateX and TranslateY with narrow ranges. Invert removed and rest of the transforms are used with wide ranges | 0.9719 |

FIG. 4D

| Transforms | Normalized affinity |
|---|---|
| flipV | -0.081 |
| flipH | 0.002 |
| ShearX | -0.004 |
| ShearY | -0.031 |
| translateX | -0.021 |
| translateY | -0.084 |
| Rotate | -0.02 |
| Autocontrast | 0 |
| Invert | -0.247 |
| Equalize | -0.12 |
| Solarize | -0.172 |
| Posterize | 0.001 |
| Contrast | -0.039 |
| Color | -0.029 |
| Brightness | -0.055 |
| Sharpness | 0.001 |
| cutout | 0.006 |

FIG. 4E

| Augmentation | Test accuracy |
|---|---|
| None | 0.770 |
| UA set: All Augmentations | 0.761 |
| UA set: All Augmentations except Invert | 0.761 |
| UA set: All Augmentations except Invert Default augmentations: Posterize, Sharpness, cutout | 0.777 |

FIG. 4F

| Transform | Range | Normalized affinity |
|---|---|---|
| ShearX | (-0.3,0.3) | -0.1005 |
| ShearX | (-0.6,0.6) | -0.1634 |
| ShearY | (-0.3,0.3) | -0.1182 |
| ShearY | (-0.6,0.6) | -0.1748 |
| translateX | (-0.45,0.45) | -0.1783 |
| translateX | (-0.9,0.9) | -0.3117 |
| translateY | (-0.45,0.45) | -0.2495 |
| translateY | (-0.9,0.9) | -0.3261 |
| rotate | (-30,30) | -0.1154 |
| rotate | (-60,60) | -0.1507 |
| autocontrast | | -0.0522 |
| Invert | | -0.4502 |
| Equalize | | -0.1541 |
| Solarize | | -0.2998 |
| Posterize | | -0.0859 |
| Contrast | | -0.1479 |
| Color | | -0.0815 |
| Brightness | | -0.1817 |
| Sharpness | | -0.0514 |
| cutout | (0,0.2) | -0.1356 |
| cutout | (0,0.4) | -0.1199 |

FIG. 4G

| Augmentation | Test accuracy |
|---|---|
| None | 0.770 |
| UA set: All Augmentations with wide ranges | 0.761 |
| UA set: Invert, Solarize and translateY are removed. TranslateX is used with narrow range and the rest of the transforms have wide ranges. | 0.7788 |

FIG. 4H

SYSTEM, METHOD AND APPARATUS FOR TRAINING A MACHINE LEARNING MODEL

CROSS-REFERENCE TO RELATED APPLICATIONS

This is the first application filed for the instantly disclosed technology.

FIELD OF THE INVENTION

The present invention generally relates to machine learning and, in particular, to a system, and a method for training a machine learning model.

BACKGROUND

Typically, a machine learning model is trained on a training dataset and is evaluated on an evaluation dataset. A dataset may consist of a set of samples such as images, texts, video files, audio files, or the like. One challenge in training the machine learning model is overcoming the problem of overfitting. Overfitting is a modeling error that happens when a model is too closely fit to a limited set of data points, resulting in relatively poor performance on the uncertain data points (evaluation dataset).

To overcome the issues with overfitting, various techniques rely on data augmentation that assist in increasing the size of the training dataset by augmenting (e.g., modifying) the set of samples in the dataset. By way of example, if the set of samples are images, then augmenting the set of samples may include cropping the images, changing the brightness level or other characteristics. Data augmentation may prevent overfitting and in general improves the performance of the trained model.

For any given dataset, different augmentations will result in different accuracies. To this end, selection of suitable data augmentation techniques to augment the dataset helps in improving the performance of the machine learning model.

There are several current techniques for selecting effective data augmentation techniques such as, for example, AutoAugment and Fast AutoAugment, which introduce a search phase to find a set of suitable data augmentation techniques for a given machine learning model and dataset prior to the training phase. These techniques come at the cost of substantial computational overhead, adding up to several thousand GPU hours. More recently, the RandAugment technique was proposed to substantially speedup the search phase by approximating the search space by a couple of hyperparameters, but the technique still incurs nonnegligible cost for tuning the search phase.

With this said, there is a need to develop an augmentation technique selection system which is reliable, accurate and capable of providing fast results with low computational overhead.

SUMMARY

Embodiments of the present disclosure have been developed based on developers' appreciation of shortcomings associated with the prior art.

In accordance with the first broad aspect of the present disclosure, there is provided a method for training a machine learning model comprising: receiving a training data set for training the machine learning model to perform a machine learning task, the training data set comprising a plurality of original training samples; augmenting the original training samples by applying default transformations stored in a default augmentation transformations list and storing the augmented training samples as a first set of augmented training samples in training data set; training the machine learning model on at least a portion of the original training samples and at least a portion of the first set of augmented training samples; computing an unaugmented accuracy of the machine learning model trained on at least a portion of the original training samples and at least a portion of the first set of augmented training samples; augmenting the original training samples and the first set of augmented training samples by applying a candidate transformation selected from a candidate augmentation transformations list and storing the augmented training samples as a second set of augmented training samples in training data set; training the machine learning model on at least a portion of the original training samples, at least a portion of the first set of augmented training samples, and at least a portion of the second set of augmented training samples; computing an augmented accuracy of the machine learning model trained on at least a portion of the original training samples, at least a portion of the first set of augmented training samples, at least a portion of the second set of augmented training samples; computing an affinity metric from the unaugmented accuracy and the augmented accuracy; updating the candidate augmentation transformations list and the default augmentation transformations list in accordance with the affinity metric; removing the second set of augmented training samples from the training data set; augmenting the original training samples and the first set of augmented training samples in accordance with transformations in the updated candidate augmentation transformations list and the updated default augmentation transformations list and storing the augmented training samples as a third set of augmented training samples in training data set; and training the machine learning model on at least a portion of the original training samples, at least a portion of the first set of augmented training samples, and at least a portion of the third set of augmented training samples to perform the machine learning task.

In accordance with other aspects of the present disclosure, the method, wherein updating the candidate augmentation transformations list and the default augmentation transformations list includes: if the affinity metric is not having an acceptable value, updating the candidate augmentation transformations list by removing the selected candidate transformation; if the affinity metric is having an acceptable value and the value is less than zero, keeping the selected transformation in the candidate augmentation transformations list; and if the affinity metric is having a positive value, removing the selected candidate transformation from the candidate augmentation transformations list and adding the selected candidate transformation to the default augmentation transformations list In accordance with other aspects of the present disclosure, the method, wherein applying the default transformation to augment the original training samples includes applying an operation as specified by the default transformation in accordance with operational parameters related to the default transformation and a probability of applying the default transformations.

In accordance with other aspects of the present disclosure, the method, wherein applying the candidate transformation to augment the original training samples and the first set of augmented training samples includes applying an operation as specified by the candidate transformation in accordance with operational parameters related to the candidate transformation and a probability of applying the candidate transformations.

In accordance with other aspects of the present disclosure, the method further comprises: altering the values of at least one of the operational parameters and the probability if the affinity metric is not having an acceptable value; augmenting the original training samples and the first set of augmented training samples by applying the candidate transformation in accordance with updated operational parameters and the updated probability and storing the augmented training samples as a fourth set of augmented training samples in training data set; training the machine learning model on at least a portion of the original training samples, at least a portion of the first set of augmented training samples, and at least a portion of the fourth set of augmented training samples; and computing again the affinity metric.

In accordance with other aspects of the present disclosure, the method further comprises traversing individually all candidate transformations in the candidate augmentation transformations list and updating the candidate augmentation transformations list and the default augmentation transformations list accordingly.

In accordance with other aspects of the present disclosure, the method further comprises selecting n transformations from the updated default augmentation transformations list and the updated candidate augmentation having top n affinity metrics and training the machine learning model in accordance with the original training samples and training samples augmented using n transformations, where n in an integer number.

In accordance with other aspects of the present disclosure, the method, wherein the training of the machine learning model on at least a portion of the original training samples, at least a portion of the first set of augmented training samples, and at least a portion of the second set of augmented training samples begins once a previous training of the machine learning model on at least a portion of the original training samples and at least a portion of the first set of augmented training samples reaches an accuracy between 50-60%.

In accordance with other aspects of the present disclosure, the method, wherein the affinity metric is a quantitative difference between the unaugmented accuracy and the augmented accuracy.

In accordance with other aspects of the present disclosure, the method, wherein the machine learning task comprises at least one of a following tasks: an image processing task; a video processing task; an audio processing task; and a text processing task.

In accordance with other aspects of the present disclosure, the method, wherein the machine learning model is previously untrained.

In accordance with other aspects of the present disclosure, the method, wherein the machine learning model is previously trained on the original training samples.

In accordance with the second broad aspect of the present disclosure, there is provided a system for training a machine learning model comprising: one or more computers; and one or more storage devices communicatively coupled to the one or more computers, wherein the one or more storage devices store instructions that, when executed by the one or more computers, cause the one or more computers to perform operations comprising: receiving a training data set for training the machine learning model to perform a machine learning task, the training data set comprising a plurality of original training samples; augmenting the original training samples by applying default transformations stored in a default augmentation transformations list and storing the augmented training samples as a first set of augmented training samples in training data set; training the machine learning model on at least a portion of the original training samples and at least a portion of the first set of augmented training samples; computing an unaugmented accuracy of the machine learning model trained on at least a portion of the original training samples and at least a portion of the first set of augmented training samples; augmenting the original training samples and the first set of augmented training samples by applying a candidate transformation selected from a candidate augmentation transformations list and storing the augmented training samples as a second set of augmented training samples in training data set; training the machine learning model on at least a portion of the original training samples, at least a portion of the first set of augmented training samples, and at least a portion of the second set of augmented training samples; computing an augmented accuracy of the machine learning model trained on at least a portion of the original training samples, at least a portion of the first set of augmented training samples, at least a portion of the second set of augmented training samples; computing an affinity metric from the unaugmented accuracy and the augmented accuracy; updating the candidate augmentation transformations list and the default augmentation transformations list in accordance with the affinity metric; removing the second set of augmented training samples from the training data set; augmenting the original training samples and the first set of augmented training samples in accordance with transformations in the updated candidate augmentation transformations list and the updated default augmentation transformations list and storing the augmented training samples as a third set of augmented training samples in training data set; and training the machine learning model on at least a portion of the original training samples, at least a portion of the first set of augmented training samples, and at least a portion of the third set of augmented training samples to perform the machine learning task.

In accordance with other aspects of the present disclosure, the system, wherein updating the candidate augmentation transformations list and the default augmentation transformations list includes: if the affinity metric is not having an acceptable value, updating the candidate augmentation transformations list by removing the selected candidate transformation; if the affinity metric is having an acceptable value and the value is less than zero, keeping the selected transformation in the candidate augmentation transformations list; and if the affinity metric is having a positive value, removing the selected candidate transformation from the candidate augmentation transformations list and adding the selected candidate transformation to the default augmentation transformations list.

In accordance with other aspects of the present disclosure, the system, wherein applying the default transformation to augment the original training samples includes applying an operation as specified by the default transformation in accordance with operational parameters related to the default transformation and a probability of applying the default transformations.

In accordance with other aspects of the present disclosure, the system, wherein applying the candidate transformation to augment the original training samples and the first set of augmented training samples includes applying an operation as specified by the candidate transformation in accordance with operational parameters related to the candidate transformation and a probability of applying the candidate transformations.

In accordance with other aspects of the present disclosure, the system further comprises: altering the values of at least one of the operational parameters and the probability if the affinity metric is not having an acceptable value; augmenting the original training samples and the first set of augmented training samples by applying the candidate transformation in accordance with updated operational parameters and the updated probability and storing the augmented training samples as a fourth set of augmented training samples; training the machine learning model on at least a portion of the original training samples, at least a portion of the first set of augmented training samples, and at least a portion of the fourth set of augmented training samples in training data set; and computing again the affinity metric.

In accordance with other aspects of the present disclosure, the system, further comprises traversing individually all candidate transformations in the candidate augmentation transformations list and updating the candidate augmentation transformations list and the default augmentation transformations list accordingly.

In accordance with other aspects of the present disclosure, the system, wherein the training of the machine learning model on at least a portion of the original training samples, at least a portion of the first set of augmented training samples, and at least a portion of the second set of augmented training samples begins once a previous training of the machine learning model on at least a portion of the original training samples and at least a portion of the first set of augmented training samples reaches an accuracy between 50-60%.

In accordance with the third broad aspect of the present disclosure, there is provided One or more non-transitory computer storage media storing instructions that when executed by one or more computers cause the one or more computers to perform operations for training a machine learning model comprising: receiving a training data set for training the machine learning model to perform a machine learning task, the training data set comprising a plurality of original training samples; augmenting the original training samples by applying default transformations stored in a default augmentation transformations list and storing the augmented training samples as a first set of augmented training samples in training data set; training the machine learning model on at least a portion of the original training samples and at least a portion of the first set of augmented training samples; computing an unaugmented accuracy of the machine learning model trained on at least a portion of the original training samples and at least a portion of the first set of augmented training samples; augmenting the original training samples and the first set of augmented training samples by applying a candidate transformation selected from a candidate augmentation transformations list and storing the augmented training samples as a second set of augmented training samples in training data set; training the machine learning model on at least a portion of the original training samples, at least a portion of the first set of augmented training samples, and at least a portion of the second set of augmented training samples; computing an augmented accuracy of the machine learning model trained on at least a portion of the original training samples, at least a portion of the first set of augmented training samples, at least a portion of the second set of augmented training samples; computing an affinity metric from the unaugmented accuracy and the augmented accuracy; updating the candidate augmentation transformations list and the default augmentation transformations list in accordance with the affinity metric; removing the second set of augmented training samples from the training data set; augmenting the original training samples and the first set of augmented training samples in accordance with transformations list in the updated candidate augmentation transformations list and the updated default augmentation transformations list and storing the augmented training samples as a third set of augmented training samples in training data set; and training the machine learning model on at least a portion of the original training samples, at least a portion of the first set of augmented training samples, and at least a portion of the third set of augmented training samples to perform the machine learning task.

BRIEF DESCRIPTION OF THE FIGURES

Further features and advantages of the present disclosure will become apparent from the following detailed description, taken in combination with the appended drawings, in which:

FIGS. 4A-4I illustrate simulation out comes in accordance with various embodiments of present disclosure.

Figure 1:
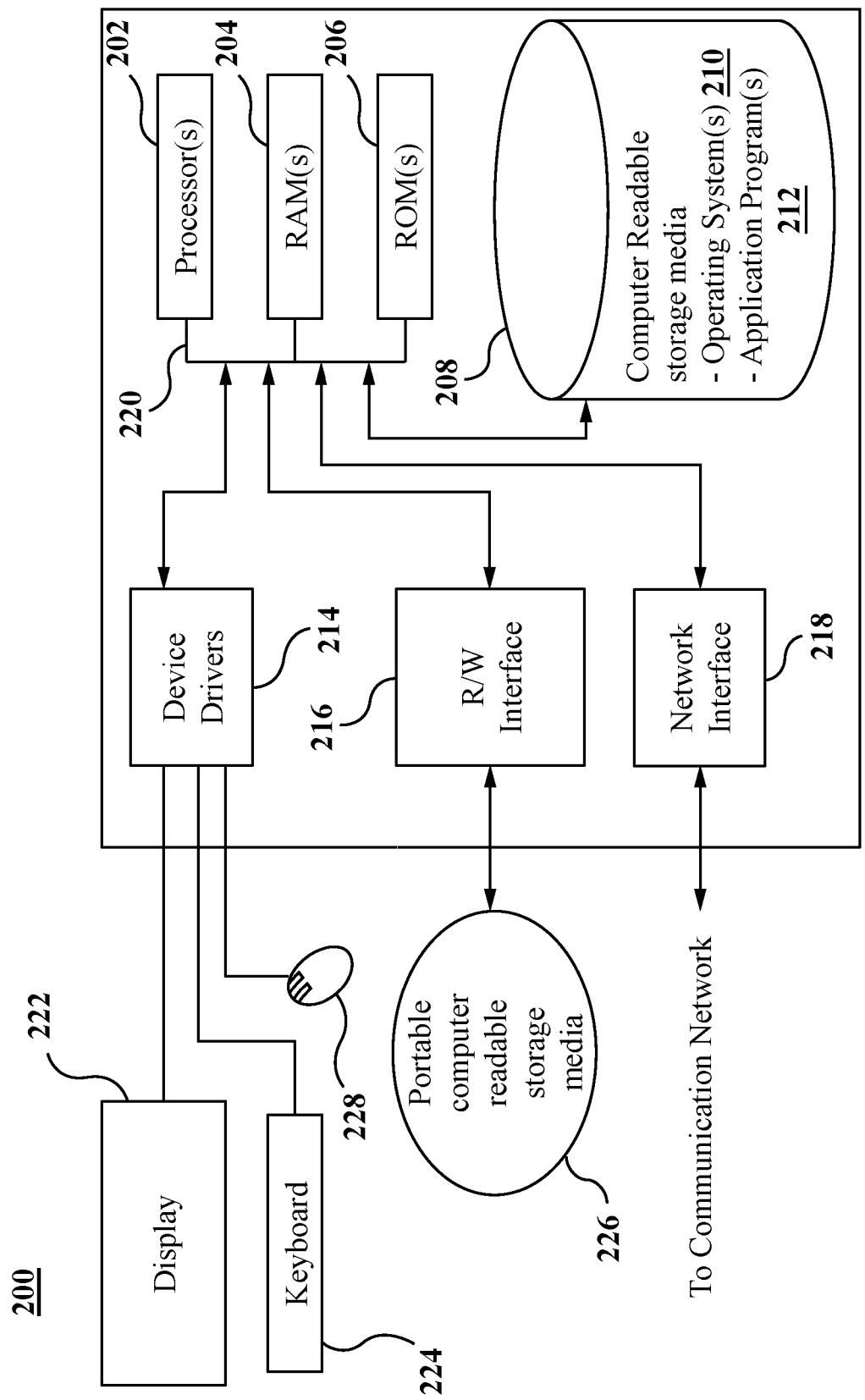
FIG. 1 depicts a high-level functional block diagram of an electronic device, in accordance with various embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and method for training a machine learning model.

Unless otherwise defined or indicated by context, all technical and scientific terms used herein have the same meaning as commonly understood by one of ordinary skill in the art to which the described embodiments appertain to.

In the context of the present specification, "electronic device" is any computer hardware that is capable of running software appropriate to the relevant task at hand. In the context of the present specification, in general the term "electronic device" is associated with a user of the electronic device. Thus, some (non-limiting) examples of electronic devices include personal computers (desktops, laptops, netbooks, etc.), smartphones, and tablets, as well as network equipment such as routers, switches, and gateways. It should be noted that a device acting as a electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

In the context of the present specification, without limiting the scope, the term "augmentation" may be referred to as a technique of augmenting (e.g., modifying, expanding, increasing, enlarging, enhancing, adding, improving, or a combination thereof) the training samples in training data set.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and method for training a machine learning model.

FIG. 1 depicts a high-level block diagram of components of electronic device 200, in accordance with various embodiments of the present disclosure. It should be appreciated that FIG. 1 provides only an illustration of one implementation of electronic device 200 and does not imply any limitations with regard to the environments in which different embodiments may be implemented. Many modifications to the depicted environment can be done to implement electronic device 200 without departing from the principles presented herein. The electronic device 200 may be a server, a desktop computer, a laptop computer, or any device that may be configured to implement the present technology, as should be understood by a person skilled in the art.

As shown, the electronic device 200 employs one or more processors 202, one or more computer-readable random access memories (RAMs) 204, one or more computer-readable read only memories (ROMs) 206, one or more computer-readable storage media 208, device drivers 214, a read/write (R/W) driver interface 216, a network interface 218, all interconnected over a communication fabric 220. The communication fabric 220 may be implemented with any architecture designed for passing data and/or control information between processors (such as microprocessors, communications and network processors, etc.), system memory, peripheral devices, and any other hardware components within a system.

One or more operating systems 210 and one or more application programs 212 are stored on one or more of computer-readable storage media 208 for execution by one or more of the processors 202 via one or more of respective RAMs 204 (which typically include a cache memory). In the illustrated embodiment, each of the computer-readable storage media 208 may be a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 216 reads from and writes to one or more portable computer-readable storage media 226. The application programs 212 may be related to the augmentation technique selection system and stored on one or more of portable computer-readable storage media 226, read via the respective R/W driver interface 216 and loaded into the respective computer-readable storage media 208.

Further, the network interface 218 may be based on a TCP/IP adapter card or wireless communication adapter (such as a 4G wireless communication adapter using OFDMA technology). The application programs 212 on electronic device 200 may be downloaded to electronic device 200 from an external computer or external storage device via a communication network (for example, the Internet, a local area network or other wide area network or wireless network) and network interface 218. From network interface 218, application programs 212 may be loaded onto the computer-readable storage media 208. The electronic device 200 may connect to routers, firewalls, switches, gateway computers and/or edge servers of the communication network using copper wires, optical fibers, wireless transmission, and the like.

The electronic device 200 may also include a display screen 222, a keyboard or keypad 224, and a computer mouse or touchpad 228. The device drivers 214 may interface with display screen 222 for imaging, with the keyboard or the keypad 224, with computer mouse or touchpad 228, and/or with display screen 222 (which may be a touch sensitive display) for alphanumeric character entry and user selections. The device drivers 214, R/W driver interface 216 and network interface 218 may comprise hardware and software (stored on the computer-readable storage media 208 and/or the ROM 206).

It is to be noted that electronic device 200 is shown as a standalone computer. However, the implementation of various other embodiments of the present disclosure may include any electronic-server model where electronic devices may run an electronic version of the application programs related to the augmentation technique selection system. Other examples of electronic device 200 may include a distributed computing system that runs the server version of the application programs related to the augmentation technique selection system, a virtual machine (or virtual machines) instantiated by the infrastructure of a public or private cloud, or a cloud service provider that provides the application programs related to the augmentation technique selection system as a service (SaaS). Such implementations or any other similar implementation should not limit the scope of the present disclosure.

Figure 2:
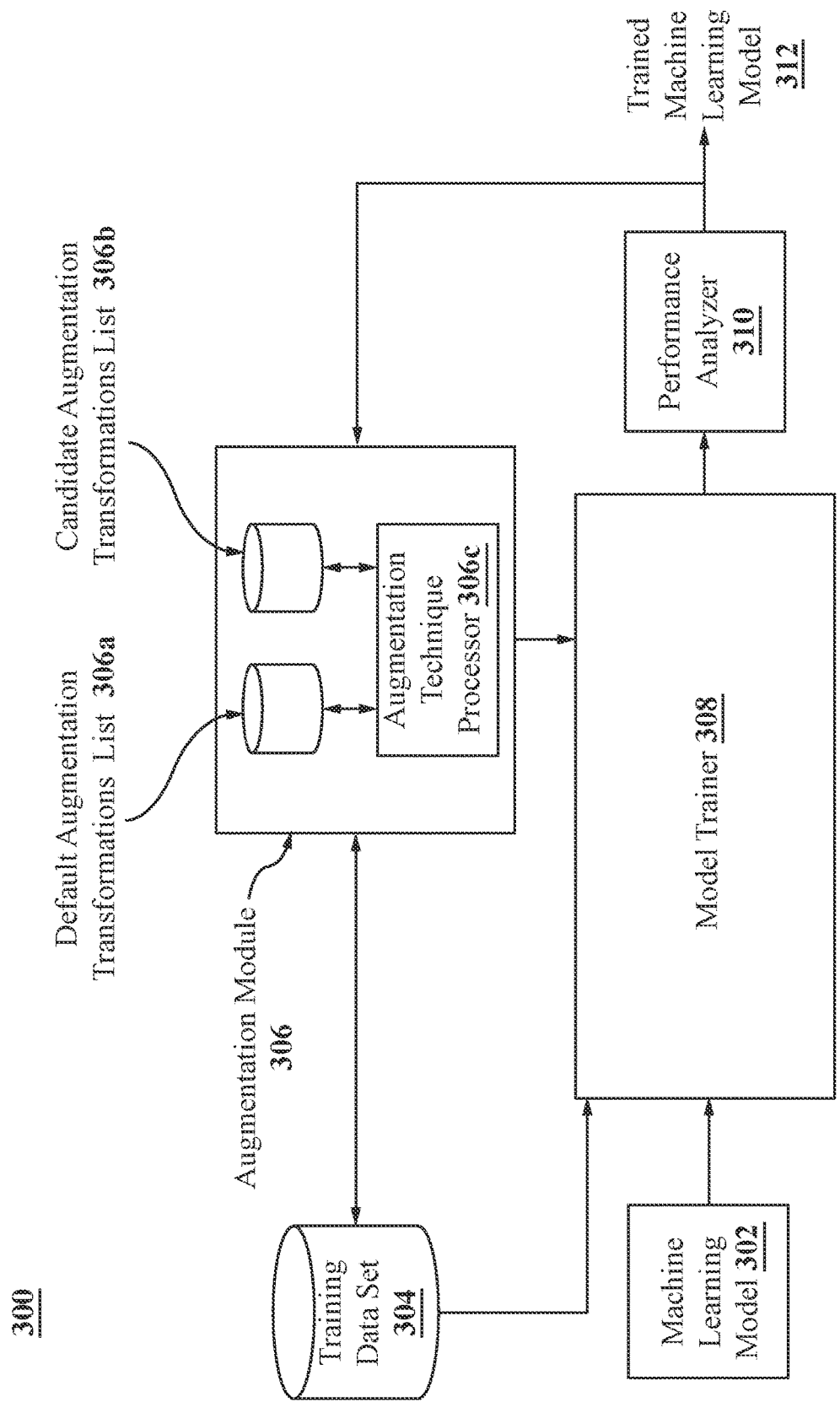
FIG. 2 illustrates a high-level functional block diagram of an augmentation technique selection system, in accordance with various embodiments of present disclosure

FIG. 2 illustrates a high-level functional block diagram of an augmentation technique selection system 300, in accordance with various embodiments of present disclosure. The augmentation technique selection system 300 may be implemented on the electronic device 200. As shown, augmentation technique selection system 300 may include an augmentation module 306 a model trainer 308, and a performance analyzer 310. The augmentation technique selection system 300 may be configured to receive a machine learning model 302 and a training data set 304. It is to be noted that augmentation technique selection system 300 may include other modules and components but have not been shown for the purpose of simplicity.

The augmentation technique selection system 300 may be configured to generate a trained machine learning model 312 that may be trained to perform a machine learning task by training machine learning model 302. In certain embodiments, model trainer 308 may be configured to train machine learning model 302 using training data set 304 and augmentation techniques that may be provided by augmentation module 306.

In some embodiments, the machine learning tasks may be related to image processing and generating a prediction based on the processed image. That is, trained machine leaning model 312 may be configured to process an input that may include an image and generate a corresponding output, such as, for example, a classification output, a regression output, or a combination thereof.

It will be appreciated that the machine leaning tasks may not be just limited to image processing, rather the machine leaning tasks may also include text processing, video processing, audio processing or the like. Following are some of the non-limiting examples of the machine learning tasks performed by trained machine learning model 312.

In one example, trained machine learning model 312 may be configured to process an image and generate a classification output that may include a representative score corresponding to each of multiple categories. The score for a category may indicate a likelihood that the image may belong to a category. In some cases, the categories may be classes of objects (e.g., dog, cat, person, and the like), and the image may belong to a category if it depicts an object included in the object class corresponding to the category. In some cases, the categories may represent global image properties (e.g., whether the image depicts a scene in the day or at night, or whether the image depicts a scene in the summer or the winter), and the image may belong to the category if it has the global property corresponding to the category.

In another example, trained machine learning machine learning model 312 may be configured to process an image to generate a regression output that estimates one or more continuous variables (i.e., that can assume infinitely many possible numerical values) that characterize the image. In one example, the regression output may estimate the coordinates of bounding boxes that enclose respective objects depicted in the image. The coordinates of a bounding box may be defined by x-y coordinates of the vertices of the bounding box.

In another example, trained machine learning machine learning model 312 may be configured to process an image and generates a pixel-level classification output that may include, for each pixel, a respective score corresponding to each of multiple categories. For a given pixel, the score for a category indicates a likelihood that pixel belongs to the category. In some cases, the categories may be classes of objects, and a pixel may belong to a category if it is part on an object included in the object class corresponding to the category. That is, the pixel-level classification output may be semantic segmentation output.

In yet another example, the machine learning task may be a speech recognition task, where trained machine learning machine learning model 312 may be configured to process a representation of an audio waveform to generate an output that characterizes a sequence of phonemes, characters, or words corresponding to the audio waveform.

In yet another example, the machine learning task may be a video analysis task, where trained machine learning model 312 may be configured to process a sequence of video frames to generate an output that characterizes the video frames, e.g., by characterizing whether the video frames depict a person performing a particular action.

In another example, the machine learning task may be a natural language processing task, where the machine learning model is configured to process a portion of text to generate an output that characterizes the portion of text, e.g., by characterizing a translation of the portion of text into a different natural language.

For convenience, the present disclosure primarily describes the machine learning task as processing an image to generate a prediction based on the image. More generally, the machine learning task can be any task that involves processing an input to generate a prediction based on the input.

The training data set 304 may include multiple training samples, where each training sample specifies a training input and a corresponding label. In certain embodiments, the training input may include an image and the corresponding label may represent an expected outcome generated by a machine learning model by processing the training input. By way of example, the label may be a classification output that specifies a category (e.g., object class) corresponding to the input image, or a regression output that specifies one or more continuous variables corresponding to the input image (e.g., object bounding box coordinates).

The machine learning model 302 may be based on any suitable machine learning algorithm, such as, for example, the machine learning model may be a random forest model, a neural network model, a support vector machine (SVM) model, a linear model, or combinations thereof.

The model trainer 308 may be configured to train machine learning model 302 using training data set 304. It is to be noted that in various scenarios, the number of training samples in training data set 304 may not be sufficient due to training machine learning model 304 with a data set having a limited number of training samples may result in overfitting. Such lack of training samples and overfitting results in relatively poor performance on unrecognized samples.

To counter the problem of overfitting, various techniques have been suggested in the state of the art. One of the approaches is to augment a training data set. Data augmentation is a strategy that enables a significant increase in the diversity of data available for training the machine learning models, without actually collecting new data. Data augmentation techniques may include, but not limited to, AutoAugment, Fast Auto Augment (FAA), Population Based Augmentation (PBA), RandAug, Adversarial AutoAugment, or the like.

Most of the above-mentioned techniques required a search phase prior to training a machine learning model. More specifically, during the search phase various techniques search for an optimal data augmentation policy. Each data augmentation policy may include subsets of various transformations to performed on the training data set for data augmentations. The optimal data augmentation policy may be group of transformation along with their operational parameters. Once an optimal data augmentation policy has been identified, the machine learning model is trained according to the identified data augmentation policy. There are certain techniques, such as, Adversarial AutoAugment that run at training time execution only, however, such techniques still require significant synchronised processing to update a machine learning model and requires almost eight times more inferences. All such techniques require a good number to processing hours to converge, resulting in a computational overhead.

With this said, augmentation technique selection system 300 may rely on augmentation module 306 to select suitable transformations for data augmentation. Unlike, the traditional techniques that operates on a group of transformations, augmentation technique selection system 300 operates on individual transformations. By way of example, in case training data set 304 includes images as training samples then the transformations may include but are not limited to geometric transformations, color space augmentations, kernel filters, mixing images, random erasing, feature space augmentation, adversarial training, generative adversarial networks, neural style transfer, meta-learning rotation operations, shearing operations, color inversion operations, or the like.

The augmentation module 306 may be configured to operate on the training samples in training data set 304 and perform augmentation to increase the number of training samples. The augmentation module 306 may include a default augmentation transformations list 306a, a candidate augmentation transformations list 306b, and an augmentation technique processor 306c. It is to be noted that augmentation module 306 may include other components and/or modules but have not been illustrated for the purpose of simplicity. Lists 306a and 306b, like other lists, may be stored in one or more memory elements, such as memories RAM 204 or computer-readable storage media 208.

The default augmentation transformations list 306a may include a list of default transformations along with the operational parameters and the probability values indicating a probability of applying a particular transformation on the training samples in training data set 304. In certain embodiments, the transformations listed in default augmentation transformations list 306a may be based on common transformations that are typically applied on a particular type of training samples. By way of example, if the training samples are images then one possible default transformation may be resizing of the image by ±10%. On the other hand, candidate augmentation transformations list 306b may include a list of all reasonably possible transformations that may be applied on training samples in in training data set 304.

The model trainer 308 may begin with training train machine learning model 302 using the original training samples present in training data set 304. Original training samples may be referred to as initial training samples present in training data set 304 and no transformations have been applied on original training samples. Training a machine learning model may refer to determining trained values of the parameters of the machine learning model 304 from initial values of the parameters of the machine learning model. The model trainer 308 may train machine learning model 304 starting from, such as, for example, randomly selected or default initial values of the machine learning model parameters.

In certain embodiments, during initial training, augmentation technique processor 306c may be configured to augment the original training samples in training data set 304 by applying the default transformations stored in default augmentation transformations list 306a. By way of example, if the default transformation is resizing of the image by ±10% with a probability value of 65%, then augmentation technique processor 306c may perform multiple resizing operation with a probability of applying 65% and within ±10% range of resizing on the image in training data set 304 to generate multiple images from one image and add all augmented images to training data set 304. The model trainer 308 may continue to train machine learning model 302 with initial augmented training data set 304. The initial augmented training data set 304 may include the original training samples in training data set 304 and a set of default augmented training samples generated by augmentation technique processor 306c in accordance with default augmentation transformations list 306a.

It is to be noted that, in some examples, the training samples may be transformed while still maintaining the same corresponding target output. For example, for an image classification task where the target output specifies a type of object depicted in the training sample, applying default transformation (e.g., resizing) to the image included in the training sample may not affect the type of object depicted in the image. Therefore, in this example, the transformed training sample may correspond to the same target output as the original training sample.

However, in certain situations, transforming the training sample may also require changing the target output of the training sample. In one example, the target output corresponding to a training sample may specify coordinates of a bounding box that encloses an object depicted in the image of the training sample. In this example, applying default transformation (e.g., resizing) to the image of the training sample may require applying the same resizing transformation to the bounding box coordinates specified by the target output.

The specific operations performed by model trainer 308 to train machine learning model 304 depends on the architecture of the machine learning model 304 such as, for example, whether the machine learning model 304 is a neural network model or a random forest model.

The performance analyzer 310 may be configured to monitor the performance of machine learning model 302 as being continuously trained by model trainer 308. In some embodiments, performance analyzer 310 may obtain a validation set by randomly partitioning a larger set of training samples in training data set 304 to generate the training data set used in training the machine learning model and the validation set used in evaluating the performance of the trained machine learning model.

The performance analyzer 310 may compute an unaugmented accuracy of machine learning model 302. It is to be noted that the unaugmented accuracy may be referred to as accuracy of machine learning model 302 when trained with initial augmented training data set 304.

In certain embodiments, initial augmented training data set 304 may include a validation data set. The validation data set may be composed of one or more training samples and default augmented training samples not used during initial training of the machine learning model 302. The performance analyzer 310 may compute the unaugmented accuracy based on any appropriate performance measure of trained machine learning model 302 on the validation set, such as, for example, an F1 score or a Matthews correlation coefficient (in the case of a classification task), or a squared-error or absolute error (in the case of a regression task) or the like.

The model trainer 308 may continue to train machine learning model 302 until the unaugmented accuracy of machine learning model 302 reaches a certain desired threshold level (e.g., 60%, a threshold may be established in any of several ways). By way of example, in certain embodiments, performance analyzer 310 may set the desired threshold level prior to computing the accuracies. When the unaugmented accuracy reaches the desired level, performance analyzer 310 may notify augmentation module 306. In response, augmentation technique processor 306c may select a candidate transformation from candidate augmentation transformations list 306b and apply the selected transformation and augment the training samples in initial training data set 304. In certain embodiments, augmentation technique processor 306c may store the training samples augmented using the candidate transformation as a separate set of candidate augmented training samples in initial training data set 304.

It is to be noted that different augmentation transformations may result in different accuracies for different type of training data sets. To this end, there is need to determine the augmentation transformations that may result in a satisfactory performance and at the same time a need to determine the augmentation transformations that may degrade the performance of machine learning model 302 based on the nature of training samples in training data set 304.

As previously discussed, various typical augmentation techniques rely on a combination of transformations for augmentation. Searching for an optimal combination of transformations in such techniques is relatively costly in terms of computational time and space. On the other hand, augmentation technique processor 306c may be configured to operate on one transformation at a time. As discussed above, augmentation technique processor 306c may select a candidate transformation from candidate augmentation transformations list 306b. The augmentation technique processor 306c may initialize the operational parameters related to the selected transformation and may set a probability with which the selected transformation may be applied to the training samples in initial training data set 304.

In one example, if the selected transformation is a rotation operation then augmentation technique processor 306c may initialize an operational parameter, degree of rotation in this case, and a probability with which the rotation may be applied to the training samples. For instance, the operational parameter may be initialized as rotation between 0 to 360 degrees with a probability of 50%. The augmentation technique processor 306c may apply rotation operation on training samples in initial training data set 304 based on above initialized operational parameters and the probability and update initial training data set 304 with the candidate augmented training samples. (In general, updating information of any kind may be achieved by changing, setting, modifying, deleting, or otherwise replacing or supplanting old information with new information.)

The model trainer 308 may continue to train machine learning model 302 with updated training data set 304. The updated training data set 304 may include the original training samples in training data set 304, the set of default augmented training samples, and the set of candidate augmented training samples. The performance analyzer 310 may analyze the performance of machine learning model 302 trained with updated training data set 304 by computing the augmented accuracy. The augmented accuracy may be referred to as the accuracy of machine learning model 302, computed by performance analyzer 310, when trained with updated augmented training data set 304. In certain embodiments, performance analyzer 310 may compute an affinity metric between the unaugmented accuracy and an augmented accuracy. The affinity metric may represent a quantitative difference between the unaugmented accuracy and the augmented accuracy. As discussed below, the affinity metric may be defined in a manner that it may have a value that is positive or negative or zero, and the further a positive affinity value from zero, the better the chance of an effective transformation.

A transformation may be considered to be effective transformation or a poor transformation based on the computed affinity metric. For example, if the affinity metric value results in an acceptable value, such as, a value that is greater than or equal to a certain threshold, then the transformation, its operational parameters, and the probability with which the transformation has been applied may be considered as an effective transformation. On the other hand, if the affinity metric does not have an acceptable value, such as, being less than the certain threshold, then the transformation, its operational parameters, and the probability with which the transformation has been applied may be considered as a poor transformation.

By way of illustration, a poor transformation may be a transformation that could result in an unrecognizable samples (e.g., images) or possibly change the class of the samples (e.g., horizontally flipping an image of number 9, will result in changing its class to number 6, which means that the image is no longer a representative of its original class). By removing the poor transforms, performance of machine learning model 302 may be improved and the accuracy of prediction may be increased. Some embodiments of the present disclosure may operate on a principle that the diversity of transformations is useful unless the transformations are likely to change the category of the samples.

With the said, augmentation technique processor 306c may update the candidate augmentation transformations list 306b and the default augmentation transformations list 306a in accordance with affinity metric.

In certain embodiments, if the affinity metric associated with the selected transformation is less than certain threshold, performance analyzer 310 may notify augmentation technique processor 306c regarding the performance of the selected transformation. As a result, augmentation technique processor 306c may be configured to update the operation parameter and/or the probability of the selected transformation. For example, instead of rotation between 0 to 360 degrees with a probability of 50%, the updated rotation may be between −180 to 180 degrees with a probability of 30%. It is to be noted that, in certain embodiments, augmentation technique processor 306c may be configured to remove the training samples augmented with the previous operation parameter and the probability and may update training data set 304 with new training samples augmented in accordance with updated operation parameter and the probability.

The model trainer 308 may continue to train machine learning model 302 and performance analyzer 310 may continue to analyze the performance. If the affinity metric of the selected transformation is still less than a certain threshold, augmentation technique processor 306c may continue to update the operational parameter and/or the probability of the selected transformation until the selected transformation is considered to be an effective transformation. In certain embodiments, if the selected transformation is not an effective transformation for any operational parameter and/or for any probability, augmentation technique processor 306c may be configured to remove that transformation from candidate augmentation transformations list 306b.

If the affinity metric of the selected transformation is greater than a certain threshold but less than zero, then the selected candidate transformation along with the updated operational parameters and the probability remains in the candidate augmentation transformations list 306b.

In certain embodiments, if the affinity metric of the selected candidate transformation is greater than zero, then augmentation technique processor 306c may remove the selected candidate transformation from candidate augmentation transformations list 306b and add the selected transformation along with the updated operational parameters and the probability to default augmentation transformations list 306a. In some examples, the transformations in default augmentation transformations list 306a may be applied with more frequency.

Once a transformation has been processed, augmentation technique processor 306c may remove the candidate augmented training samples from training data set 304 and may select another transformation in candidate augmentation transformations list 306b. The augmentation technique processor 306c may process the selected transformation in a similar manner as discussed above. It is to be noted that, in certain embodiments, augmentation technique processor 306c may be configured to process all the transformations stored in candidate augmentation transformations list 306b and update default augmentation transformations list 306a and candidate augmentation transformations list 306b.

In some embodiments, after processing all the transformations, augmentation technique processor 306c may augment the original training samples and the set of default augmented training samples in training data set 304 by applying the transformations in updated default augmentation transformations list 306a and updated candidate augmentation transformations list 306b and may store the augmented training samples as a set of final augmented training samples in training data set 304. The model trainer 308 may continue to train machine learning model 302 with original training samples, the set of default augmentation training samples and the set of final augmented training samples in training data set 304.

In other embodiments, after processing all the transformations, augmentation technique processor 306c may select n transformations from the updated default augmentation transformations list 306a and the updated candidate augmentation 306b having top n affinity metrics and training machine learning model 302 in accordance with the original training samples and training samples augmented using n transformations, where n is an integer number.

It is to be noted that for different types of training data sets, augmentation module 306 may provide custom default augmentation transformations list 306a and candidate augmentation transformations list 306b, taking into consideration the characteristics of training samples in training data set 304. By way of example, the transformation for image type training samples may be different from the transformations for audio, video or text type training samples.

Further, augmentation module 306 may be configured to process individual transformations rather than a combination of transformations (as suggested in certain prior art solutions), resulting in a faster searching of efficient transformations for a given training data set.

In certain embodiments, searching for effective transformations may be performed as a separate searching operation instead of being performed during training time. In such embodiments, a machine learning model trained on original data set may be used to identify effective transformations. Once the transformations have been identified, the machine learning model may be trained with updated training data set including the training samples augmented using effective transformations along with the original training samples.

Figure 3:
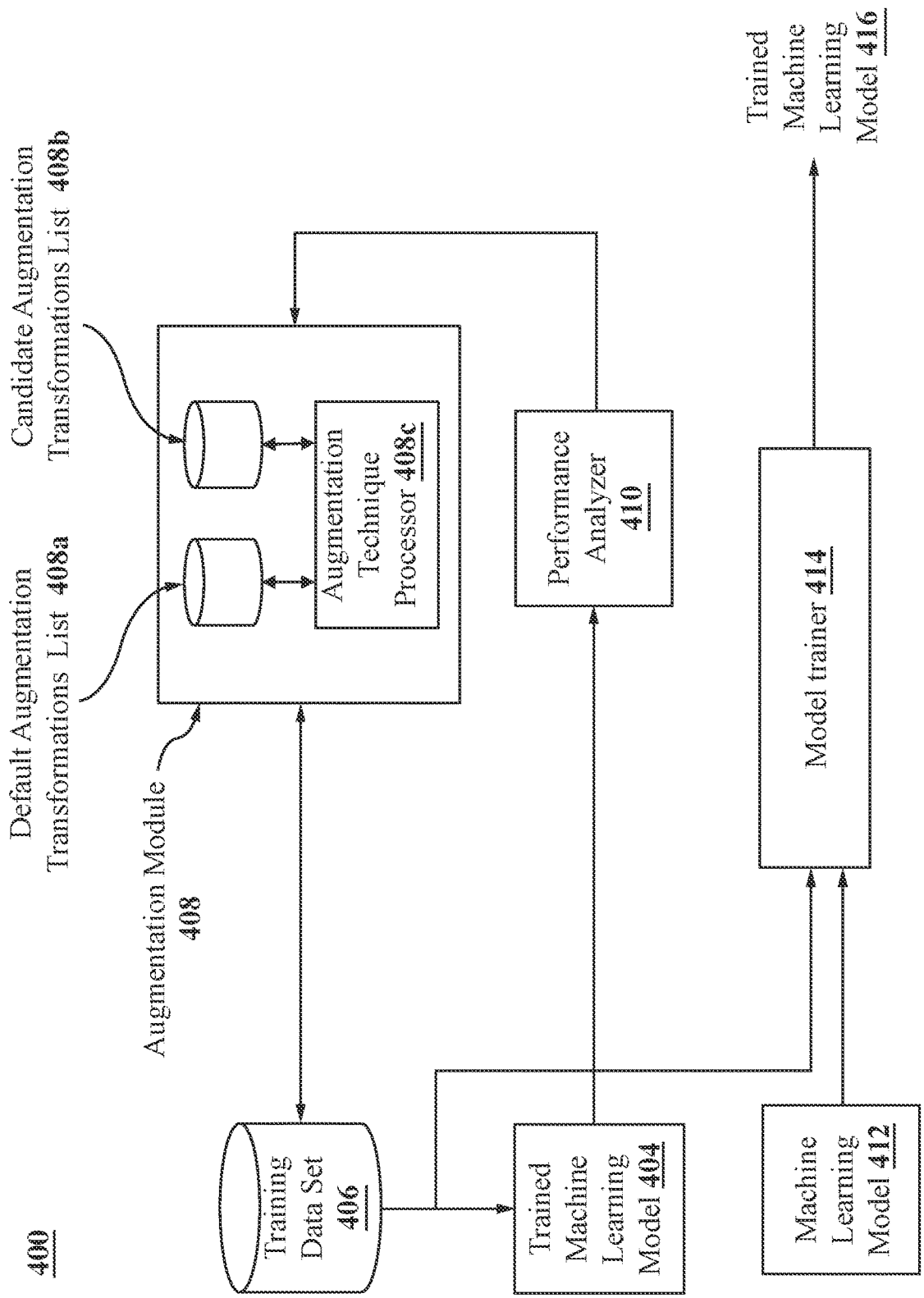
FIG. 3 illustrates a high-level functional block diagram of another augmentation technique selection system, in accordance with various embodiments of present disclosure.

FIG. 3 illustrates a high-level functional block diagram of an augmentation technique selection system 400, in accordance with various embodiments of present disclosure. The augmentation technique selection system 400 may be implemented on the electronic device 200. As shown, augmentation technique selection system 400 may include an augmentation module 408, and a performance analyzer 410 and a model trainer 414. Also, augmentation module 408 may include a default augmentation transformations list 408a, a candidate augmentation transformations list 408b, and an augmentation technique processor 408c. The augmentation technique selection system 400 may be configured to receive a trained machine learning model 404 and a training data set 406. The augmentation technique selection system 400 may include other modules and components but have not shown for the purpose of simplicity.

It is to be noted that trained machine learning model 404 may be pretrained on the original training samples in training data set 406. Also, training data set 406 may be similar to training data set 304. The difference between augmentation technique selection system 300 and augmentation technique selection system 400 is that instead of training a machine learning model 302 up to certain accuracy and then updating default augmentation transformations list 306a and candidate augmentation transformations list 306b while still training machine learning model 302, in augmentation technique selection system 400, machine learning model 404 may be completely trained, by model trainer 414, on original training samples in training data set 406 prior to searching for the effective transformation. Moreover, augmentation module 408 and the associated components and modules may operate in a similar manner augmentation module 306, and performance analyzer 410 may operate in similar manner as performance analyzer 310. The augmentation technique processor 408c may update default transformations list 408a and candidate augmentation transformations list 408b in a similar manner as discussed above with respect to augmentation technique selection system 300.

Once default transformations list 408a and candidate augmentation transformations list 408b have been updated by augmentation technique processor 408c, the transformations in updated lists 408a and 408b may be used by model trainer 414 to effectively train other machine learning models such as machine learning model 412. Also, in some examples, trained machine learning model 404 may be further trained based on training samples augmented using transformations in updated lists 408a and 408b. In any case, model trainer 414 may provide a final trained machine learning model 416.

Figure 4I:
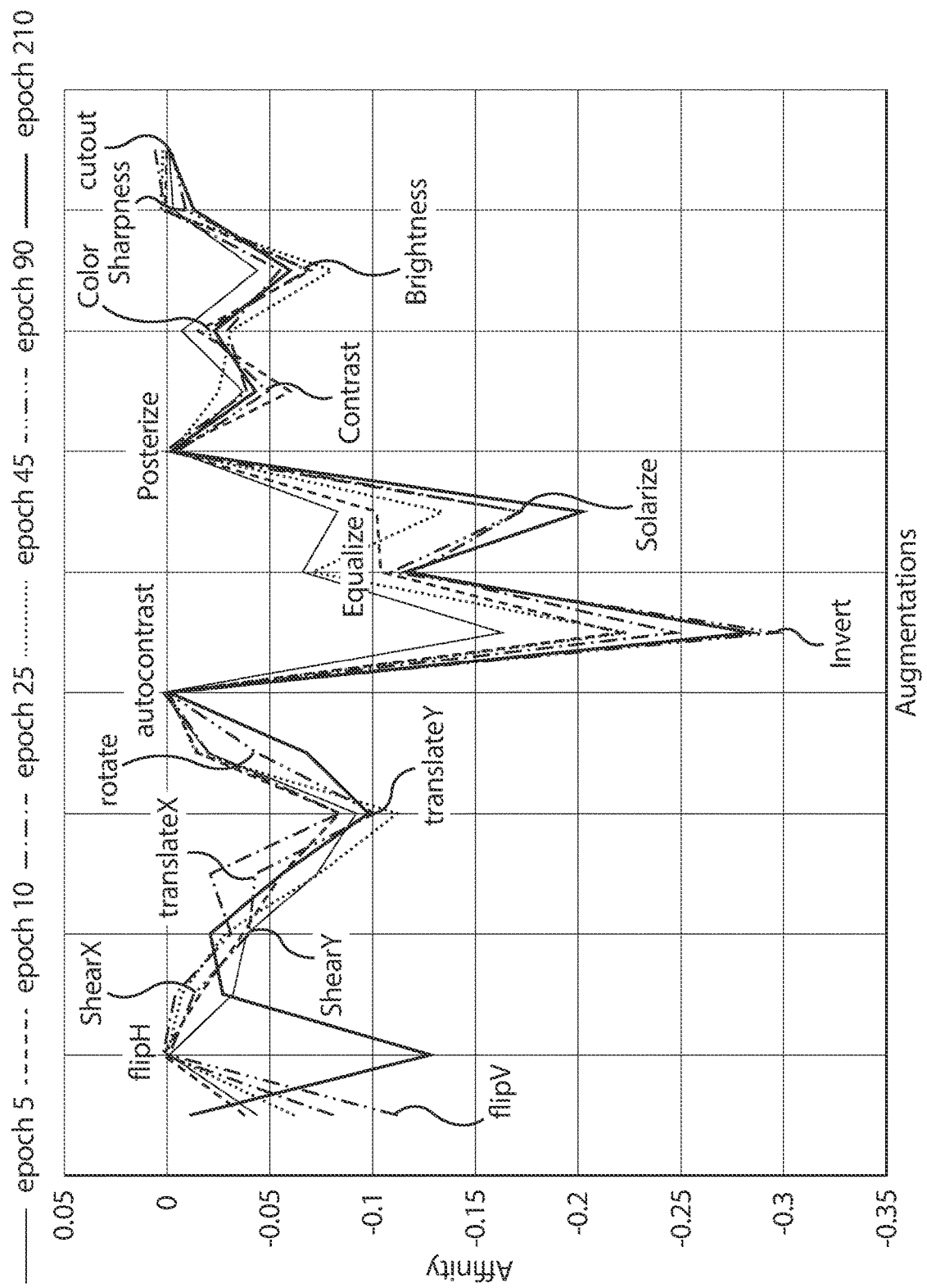

FIGS. 4A-4J illustrate simulation out comes in accordance with various embodiments of present disclosure. In particular, FIG. 4A illustrates various transformations and their normalized affinity metrics with MNIST as database and Resnet 28×10 as machine learning model. As observed, vertical flip, horizontal flip and invert have very low values for affinity metric, indicating that these augmentation transforms are very likely to produce out of distribution samples. In one example, without limiting the scope of present disclosure, a threshold to filter out poor transformations is considered as −0.2. Also, a normalization of affinity metrics makes it easy to compare different dataset characteristics and performance. FIG. 4B depicts a comparison of accuracy of machine learning model without any augmentation, with Uniform Augment (UA) augmentation transformation set, and UA augmentation transformation set without FlipV, FlipH and Invert transformations. Removing FlipV, FlipH and Invert transformations from the set of UA augmentations, improves the overall accuracy of the machine learning model.

FIG. 4C illustrates various transformations and their normalized affinity metrics with CiFar10 as database and Resnet 28×10 as machine learning model. As observed, Invert has very low values for affinity metric and Rotate, TranslateX and TranslateY transformations should be used with narrow ranges while other transformations may be used with wide ranges. FIG. 4D depicts a comparison of accuracy of machine learning model without any augmentation, with UA augmentation transformation set, and UA augmentation transformation set without Invert transformation and using Rotate, TranslateX and TranslateY transformations used with narrow ranges improves the overall accuracy of the machine learning model.

FIG. 4E illustrates various transformations and their normalized affinity metrics with IdenProf as database and Resnet 50 as machine learning model. As observed, Invert has very low values for affinity metric and Posterize, sharpness and cutout transformations have a positive affinity metrics. FIG. 4F depicts a comparison of accuracy of machine learning model without any augmentation, with UA augmentation transformation set, UA augmentation transformation set without Invert transformation, UA augmentation transformation set without Invert transformation and Posterize, sharpness and cutout transformations being added to default augmentation transformations list improves the overall accuracy of the machine learning model.

FIG. 4G illustrates various transformations and their normalized affinity metrics with IdenProf as database and Resnet 50 as machine learning model. As observed, Invert, Solrize, and TranslateY transformations have very low values for affinity metric and TranslateX transformation should be used with narrow range while other transformations may be used with wide ranges. FIG. 4H depicts a comparison of accuracy of machine learning model without any augmentation, with UA augmentation transformation set, UA augmentation transformation set with all transformation with wide ranges, UA augmentation transformation set without Invert, Solrize, and TranslateY transformations and using TranslateX transformation used with narrow range improves the overall accuracy of the machine learning model FIG. 4I illustrates affinity metric patterns over different epochs. At early epochs (e.g., epoch 5), when a machine learning model has not converged yet, the accuracy of the machine learning model on original training samples and augmented training samples may not be significantly different from each other. Thus, lower values of affinity metric at early epochs has not been observed. Also, at late epochs (e.g., epoch 270), the machine learning model is over-fitted on original training samples, to this end, the affinity metric may be very specific to that model and will not be general enough. With this said, in various embodiments of the present disclosure, affinity metric is calculated when a machine learning model has just started to converge and reaches approximately to an accuracy between 50-60%.

Figure 5:
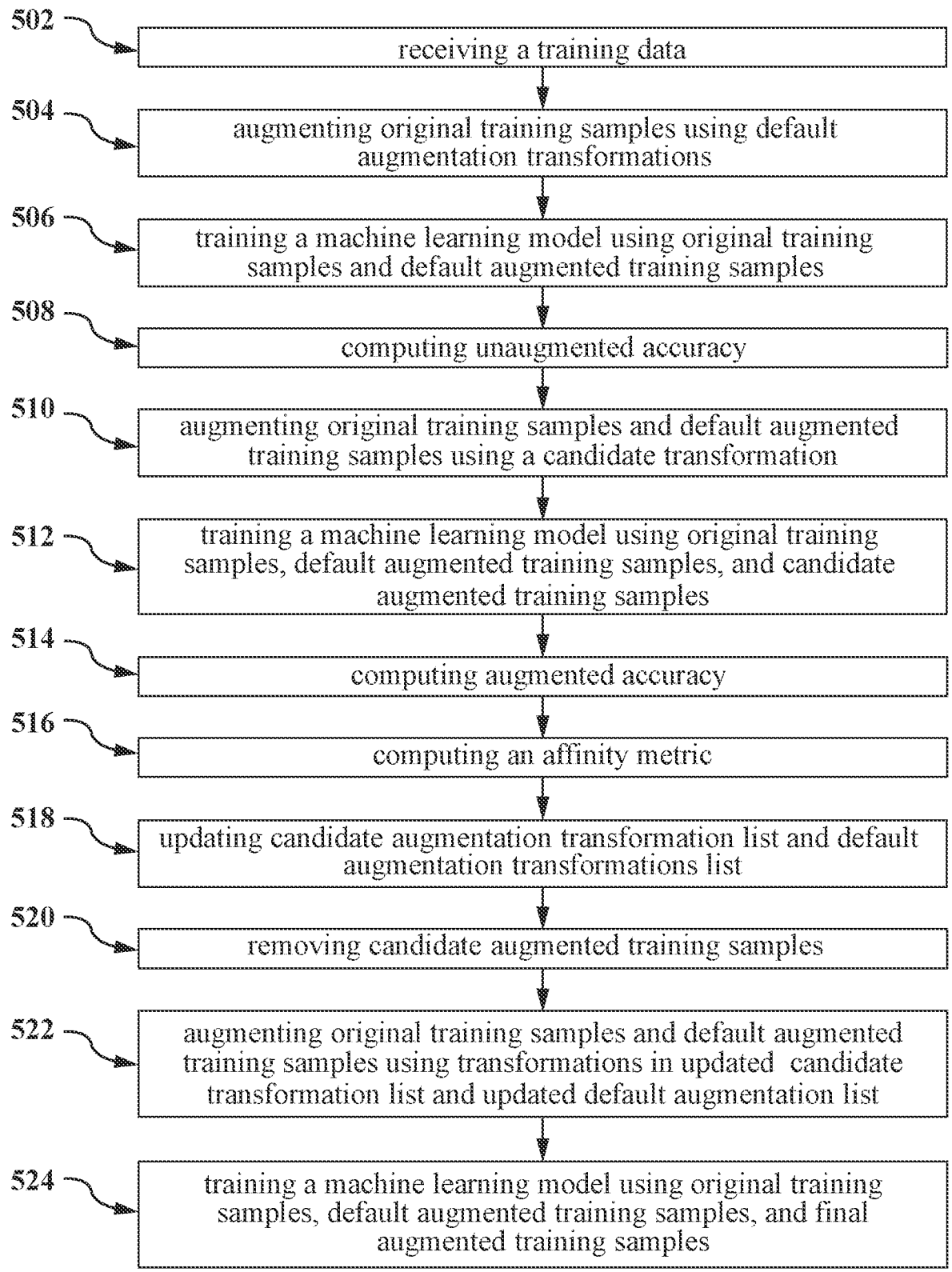
FIG. 5 depicts a flowchart representing a process corresponding to a method for training a machine learning algorithm implemented on the augmentation technique selection system, in accordance with various embodiments of the present disclosure.

FIG. 5 depicts a flowchart representing a process 500 corresponding to a method for training a machine learning algorithm implemented on the augmentation technique selection system 300, in accordance with various embodiments of the present disclosure. As shown, process 500 begins at step 502 where augmentation technique selection system 300 receives a training data set for training a machine learning model to perform a machine learning task, the training data set comprising a plurality of original training samples. As noted above, augmentation technique selection system 300 receives training data set 304 to train machine learning model 302. The training data set 304 includes a plurality of original training samples.

The process 500 advances to step 504 where augmentation technique selection system 300 augments the original training samples by applying default transformations stored in a default augmentation transformations list and stores the augmented training samples as a first set of augmented training samples in training data set. As previously noted, augmentation technique processor 306c augments the original training samples in training data set 304 by applying the default transformations stored in default augmentation transformations list 306a and storing the set of default augmented training samples in training data set 304.

The process 500 moves to step 506 where augmentation technique selection system 300 trains the machine learning model on at least a portion of the original training samples and at least a portion of the first set of augmented training samples. As discussed above, model trainer 308 trains the machine learning model 302 on at least a portion of the original training samples and at least a portion of the set of default augmented training samples.

The process 500 proceeds to step 508 where augmentation technique selection system 300 computes an unaugmented accuracy of the machine learning model trained on at least a portion of the original training samples and at least a portion of the first set of augmented training samples. As previously discussed, performance analyzer 310 computes an unaugmented accuracy of machine learning model 302.

The process 500 moves to step 510 where augmentation technique selection system 300 augments the original training samples and the first set of augmented training samples by applying a candidate transformation selected from a candidate augmentation transformations list and stores the augmented training samples as a second set of augmented training samples in training data set. As noted above, augmentation technique processor 306c selects a candidate transformation from candidate augmentation transformations list 306b and apply the selected transformation and augment the training samples in initial training data set 304. The augmentation technique processor 306c may store the training samples augmented using the candidate transformation as a separate set of candidate augmented training samples in initial training data set 304.

The process 500 advances to step 512 where augmentation technique selection system 300 trains the machine learning model on at least a portion of the original training samples, at least a portion of the first set of augmented training samples, and at least a portion of the second set of augmented training samples. As noted previously, model trainer 308 trains machine learning model 302 on at least a portion of the original training samples, at least a portion of the set of default augmented training samples, and at least a portion of the set of candidate augmented training samples.

The process 500 proceeds to step 514 where augmentation technique selection system 300 computes an augmented accuracy of the machine learning model trained on at least a portion of the original training samples, at least a portion of the first set of augmented training samples, at least a portion of the second set of augmented training samples. As previously discussed, performance analyzer 310 computes an augmented accuracy of machine learning model 302.

The process 500 advances to step 516 where augmentation technique selection system 300 computes an affinity metric from the unaugmented accuracy and the augmented accuracy. As previously discussed, performance analyzer 310 computes an affinity metric between the unaugmented accuracy and an augmented accuracy. The affinity metric may represent a quantitative difference between the unaugmented accuracy and the augmented accuracy.

The process 500 moves to step 518 where augmentation technique selection system 300 updates the candidate augmentation transformations list and the default augmentation transformations list in accordance with the affinity metric. As noted above, augmentation technique processor 306c updates the candidate augmentation transformations list 306b and the default augmentation transformations list 306a in accordance with affinity metric.

The process 500 advances to step 520 where augmentation technique selection system 300 removes the second set of augmented training samples from the training data set. As previously discussed, once a transformation has been processed, augmentation technique processor 306c removes the candidate augmented training samples from training data set 304.

The process 500 proceeds to step 522 where augmentation technique selection system 300 augments the original training samples and the first set of augmented training samples in accordance with transformations in the updated candidate augmentation transformations list and the updated default augmentation transformations list and storing the augmented training samples as a third set of augmented training samples in training data set. As discussed above, augmentation technique processor 306c augments augmentation technique processor 306c augments the original training samples and the set of default augmented training samples in training data set 304 by applying the transformations in updated default augmentation transformations list 306a and updated candidate augmentation transformations list 306b and stores the augmented training samples as a set of final augmented training samples in training data set 304.

Finally, at step 524 augmentation technique selection system 300 trains the machine learning model on at least a portion of the original training samples, at least a portion of the first set of augmented training samples, and at least a portion of the third set of augmented training samples to perform the machine learning task. As previously discussed, model trainer 308 continues to train machine learning model 302 with the original training samples, the set of default augmentation training samples and the set of final augmented training samples in training data set 304 to perform the machine learning task.

It is to be understood that the operations and functionality of augmentation technique selection system 300, constituent components, and associated processes may be achieved by any one or more of hardware-based, software-based, and firmware-based elements. Such operational alternatives do not, in any way, limit the scope of the present disclosure. Further, it is to be understood that the operations and functionality of augmentation technique selection system 300, constituent components, and associated processes are directed toward improvement the performance of one or more of the hardware-based, software-based, and firmware-based elements.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for training a machine learning model comprising:
    receiving a training data set for training the machine learning model to perform a machine learning task, the training data set comprising a plurality of original training samples;
    augmenting the original training samples by applying default transformations stored in a default augmentation transformations list and storing the augmented training samples as a first set of augmented training samples in the training data set;
    training the machine learning model on at least a portion of the original training samples and at least a portion of the first set of augmented training samples;
    computing an unaugmented accuracy of the machine learning model trained on at least a portion of the original training samples and at least a portion of the first set of augmented training samples;
    augmenting the original training samples and the first set of augmented training samples by applying a candidate transformation selected from a candidate augmentation transformations list and storing the augmented training samples as a second set of augmented training samples in the training data set;
    training the machine learning model on at least a portion of the original training samples, at least a portion of the first set of augmented training samples, and at least a portion of the second set of augmented training samples;
    computing an augmented accuracy of the machine learning model trained on at least a portion of the original training samples, at least a portion of the first set of augmented training samples, at least a portion of the second set of augmented training samples;
    computing an affinity metric from the unaugmented accuracy and the augmented accuracy;
    updating the candidate augmentation transformations list and the default augmentation transformations list in accordance with the affinity metric;
    removing the second set of augmented training samples from the training data set;
    augmenting the original training samples and the first set of augmented training samples in accordance with transformations in the updated candidate augmentation transformations list and the updated default augmentation transformations list and storing the augmented training samples as a third set of augmented training samples in the training data set; and
    training the machine learning model on at least a portion of the original training samples, at least a portion of the first set of augmented training samples, and at least a portion of the third set of augmented training samples to perform the machine learning task.

2. The method of claim 1, wherein updating the candidate augmentation transformations list and the default augmentation transformations list includes:
    if the affinity metric does not have an acceptable value, updating the candidate augmentation transformations list by removing the selected candidate transformation;
    if the affinity metric has an acceptable value and the value is less than zero, keeping the selected transformation in the candidate augmentation transformations list; and
    if the affinity metric has a positive value, removing the selected candidate transformation from the candidate augmentation transformations list and adding the selected candidate transformation to the default augmentation transformations list.

3. The method of claim 1, wherein applying the default transformation to augment the original training samples includes applying an operation as specified by the default transformation in accordance with operational parameters related to the default transformation and a probability of applying the default transformations.

4. The method of claim 1, wherein applying the candidate transformation to augment the original training samples and the first set of augmented training samples includes applying an operation as specified by the candidate transformation in accordance with operational parameters related to the candidate transformation and a probability of applying the candidate transformations.

5. The method of claim 4 further comprises:
    altering the values of at least one of the operational parameters and the probability if the affinity metric does not have an acceptable value;
    augmenting the original training samples and the first set of augmented training samples by applying the candidate transformation in accordance with updated operational parameters and the updated probability and storing the augmented training samples as a fourth set of augmented training samples in the training data set;
    training the machine learning model on at least a portion of the original training samples, at least a portion of the first set of augmented training samples, and at least a portion of the fourth set of augmented training samples; and
    computing again the affinity metric.

6. The method of claim 1 further comprises traversing individually all candidate transformations in the candidate augmentation transformations list and updating the candidate augmentation transformations list and the default augmentation transformations list accordingly.

7. The method of claim 1 further comprises selecting n transformations from the updated default augmentation transformations list and the updated candidate augmentation having top n affinity metrics and training the machine learning model in accordance with the original training samples and training samples augmented using n transformations, where n is an integer number.

8. The method of claim 1, wherein the training of the machine learning model on at least a portion of the original training samples, at least a portion of the first set of augmented training samples, and at least a portion of the second set of augmented training samples begins once a previous training of the machine learning model on at least a portion of the original training samples and at least a portion of the first set of augmented training samples reaches an accuracy between 50-60%.

9. The method of claim 1, wherein the affinity metric is a quantitative difference between the unaugmented accuracy and the augmented accuracy.

10. The method of claim 1, wherein the machine learning task comprises at least one of a following tasks:
an image processing task;
a video processing task;
an audio processing task; and
a text processing task.

11. The method of claim 1, wherein the machine learning model is previously untrained.

12. The method of claim 1, wherein the machine learning model is previously trained on the original training samples.

13. A system for training a machine learning model comprising:
one or more computers; and
one or more storage devices communicatively coupled to the one or more computers, wherein the one or more storage devices store instructions that, when executed by the one or more computers, cause the one or more computers to perform operations comprising:
receiving a training data set for training the machine learning model to perform a machine learning task, the training data set comprising a plurality of original training samples;
augmenting the original training samples by applying default transformations stored in a default augmentation transformations list and storing the augmented training samples as a first set of augmented training samples in the training data set;
training the machine learning model on at least a portion of the original training samples and at least a portion of the first set of augmented training samples;
computing an unaugmented accuracy of the machine learning model trained on at least a portion of the original training samples and at least a portion of the first set of augmented training samples;
augmenting the original training samples and the first set of augmented training samples by applying a candidate transformation selected from a candidate augmentation transformations list and storing the augmented training samples as a second set of augmented training samples in the training data set;
training the machine learning model on at least a portion of the original training samples, at least a portion of the first set of augmented training samples, and at least a portion of the second set of augmented training samples;
computing an augmented accuracy of the machine learning model trained on at least a portion of the original training samples, at least a portion of the first set of augmented training samples, at least a portion of the second set of augmented training samples;
computing an affinity metric from the unaugmented accuracy and the augmented accuracy;
updating the candidate augmentation transformations list and the default augmentation transformations list in accordance with the affinity metric;
removing the second set of augmented training samples from the training data set;
augmenting the original training samples and the first set of augmented training samples in accordance with transformations in the updated candidate augmentation transformations list and the updated default augmentation transformations list and storing the augmented training samples as a third set of augmented training samples in the training data set; and
training the machine learning model on at least a portion of the original training samples, at least a portion of the first set of augmented training samples, and at least a portion of the third set of augmented training samples to perform the machine learning task.

14. The system of claim 13, wherein updating the candidate augmentation transformations list and the default augmentation transformations list includes:
if the affinity metric does not have an acceptable value, updating the candidate augmentation transformations list by removing the selected candidate transformation;
if the affinity metric has an acceptable value and the value is less than zero, keeping the selected transformation in the candidate augmentation transformations list; and
if the affinity metric has a positive value, removing the selected candidate transformation from the candidate augmentation transformations list and adding the selected candidate transformation to the default augmentation transformations list.

15. The system of claim 13, wherein applying the default transformation to augment the original training samples includes applying an operation as specified by the default transformation in accordance with operational parameters related to the default transformation and a probability of applying the default transformations.

16. The system of claim 13, wherein applying the candidate transformation to augment the original training samples and the first set of augmented training samples includes applying an operation as specified by the candidate transformation in accordance with operational parameters related to the candidate transformation and a probability of applying the candidate transformations.

17. The system of claim 16 further comprises:
altering the values of at least one of the operational parameters and the probability if the affinity metric does not have an acceptable value;
augmenting the original training samples and the first set of augmented training samples by applying the candidate transformation in accordance with updated operational parameters and the updated probability and storing the augmented training samples as a fourth set of augmented training samples;
training the machine learning model on at least a portion of the original training samples, at least a portion of the first set of augmented training samples, and at least a portion of the fourth set of augmented training samples in the training data set; and computing again the affinity metric.

18. The system of claim 13 further comprises traversing individually all candidate transformations in the candidate augmentation transformations list and updating the candidate augmentation transformations list and the default augmentation transformations list accordingly.

19. The system of claim 13, wherein the training of the machine learning model on at least a portion of the original training samples, at least a portion of the first set of augmented training samples, and at least a portion of the second set of augmented training samples begins once a previous training of the machine learning model on at least a portion of the original training samples and at least a portion of the first set of augmented training samples reaches an accuracy between 50-60%.

20. One or more non-transitory computer storage media storing instructions that when executed by one or more computers cause the one or more computers to perform operations for training a machine learning model comprising:

receiving a training data set for training the machine learning model to perform a machine learning task, the training data set comprising a plurality of original training samples;

augmenting the original training samples by applying default transformations stored in a default augmentation transformations list and storing the augmented training samples as a first set of augmented training samples in the training data set;

training the machine learning model on at least a portion of the original training samples and at least a portion of the first set of augmented training samples;

computing an unaugmented accuracy of the machine learning model trained on at least a portion of the original training samples and at least a portion of the first set of augmented training samples;

augmenting the original training samples and the first set of augmented training samples by applying a candidate transformation selected from a candidate augmentation transformations list and storing the augmented training samples as a second set of augmented training samples in the training data set;

training the machine learning model on at least a portion of the original training samples, at least a portion of the first set of augmented training samples, and at least a portion of the second set of augmented training samples;

computing an augmented accuracy of the machine learning model trained on at least a portion of the original training samples, at least a portion of the first set of augmented training samples, at least a portion of the second set of augmented training samples;

computing an affinity metric from the unaugmented accuracy and the augmented accuracy;

updating the candidate augmentation transformations list and the default augmentation transformations list in accordance with the affinity metric;

removing the second set of augmented training samples from the training data set;

augmenting the original training samples and the first set of augmented training samples in accordance with transformations in the updated candidate augmentation transformations list and the updated default augmentation transformations list and storing the augmented training samples as a third set of augmented training samples in the training data set; and training the machine learning model on at least a portion of the original training samples, at least a portion of the first set of augmented training samples, and at least a portion of the third set of augmented training samples to perform the machine learning task.

* * * * *